(12) United States Patent
El-Shishiny

(10) Patent No.: US 8,041,559 B2
(45) Date of Patent: Oct. 18, 2011

(54) SYSTEM AND METHOD FOR DISAMBIGUATING NON DIACRITIZED ARABIC WORDS IN A TEXT

(75) Inventor: Hisham El-Shishiny, Giza (EG)

(73) Assignee: International Business Machines Corporation, Armonk, NY (US)

( * ) Notice: Subject to any disclaimer, the term of this patent is extended or adjusted under 35 U.S.C. 154(b) by 1384 days.

(21) Appl. No.: 11/299,220

(22) Filed: Dec. 9, 2005

(65) Prior Publication Data

US 2006/0129380 A1    Jun. 15, 2006

(30) Foreign Application Priority Data

Dec. 10, 2004   (EP) .................................. 04300877

(51) Int. Cl.
*G06F 17/27* (2006.01)
(52) U.S. Cl. ............................. 704/9; 704/10
(58) Field of Classification Search .................. 704/9, 10
See application file for complete search history.

(56) References Cited

U.S. PATENT DOCUMENTS

| | | | |
|---|---|---|---|
| 5,758,322 A | 5/1998 | Rongley | |
| 2002/0178394 A1* | 11/2002 | Bamberger et al. ................ | 714/1 |
| 2004/0006456 A1* | 1/2004 | Loofbourrow et al. ........... | 704/4 |
| 2005/0015237 A1* | 1/2005 | Debili .............................. | 704/2 |

OTHER PUBLICATIONS

Smith, Jennifer, Noun Faithfulness: On the priviledged behavior of nouns in phonology May 21, 1997, University of Massachussets, Amherst, pp. 1-27.*

(Continued)

*Primary Examiner* — Jakieda R Jackson
(74) *Attorney, Agent, or Firm* — Brevetto Law Group

(57) ABSTRACT

The present invention proposes a solution to the problem of word lexical disambiguation in Arabic texts. This solution is based on text domain-specific knowledge, which facilitates the automatic vowel restoration of modern standard Arabic scripts. Texts similar in their contents, restricted to a specific field or sharing a common knowledge can be grouped in a specific category or in a specific domain (examples of specific domains; sport, art, economic, science . . . ). The present invention discloses a method, system and computer program for lexically disambiguating non diacritized Arabic words in a text based on a learning approach that exploits; Arabic lexical look-up, and Arabic morphological analysis, to train the system on a corpus of diacritized Arabic text pertaining to a specific domain. Thereby, the contextual relationships of the words related to a specific domain are identified, based on the valid assumption that there is less lexical variability in the use of the words and their morphological variants within a domain compared to an unrestricted text.

10 Claims, 3 Drawing Sheets

OTHER PUBLICATIONS

Yarowsky, D., A comparison of corpus-based techniques for restoring accents in Spanish and French text 1994, Proceedings of the Second Annual Workshp on Very Large Corpora, pp. 19-32.*

Tufis, D., Automatic diacritics insertion in Romanian texts. 1999, Proceedings of the International Conference on Computational Lexicography, pp. 185-194.*

Simard, M., Automatic insertion of accents in French text. 1998, Proceedings of the Third Conference on Empirical Methods in Natural Language Processing, pp. 27-35.*

Mihalcea R., Diacritics restoration: Learning from letters versus learning from words. 2002, CICLing, pp. 339-348.*

Mihalcea R., Letter level learning form language independent diacritics restoration. 2002, CICLing, pp. 105-111.*

Yoon, Aesun, Building a Domain-Specific French-Korean Lexicon 2000, Pusa National University, pp. 465-474.*

European Search Report for application No. EP 05 11 0694 dated May 12, 2006.

Debili, Fathi et al.; "Voyellation Automatique de l'arabe"; Computational Approaches to Semitic Languages—Proceedings of the Workshop; Association for Computational Linguistics Stroudsburg, PA, USA; Aug. 16, 1998; pp. 42-49.

Kirchhoff, K.; "Novel Speech Recognition Models for Arabic"; Sep. 30, 2003; Johns-Hopkins University Summer Research Workshop 2002, Final Report; pp. 1-109.

Todd, S.; "Abbreviated Typing for Word Processing"; Feb. 1979; IBM Technical Disclosure Bulletin, vol. 21, No. 9; pp. 3796-3797.

* cited by examiner

SYSTEM AND METHOD FOR DISAMBIGUATING NON DIACRITIZED ARABIC WORDS IN A TEXT

TECHNICAL FIELD OF THE INVENTION

The present invention relates to Arabic language and in particular to a system, method and computer program for lexically disambiguating non diacritized Arabic words in a text, based on a learning approach that exploits Arabic lexical look-up and Arabic morphological analysis. The disambiguating system is trained on a corpus of diacritized Arabic text pertaining to a specific domain.

BACKGROUND ART

The Arabic Alphabet consists of twenty eight letters, twenty five of which represent consonants. The remaining three letters represent the long vowels of Arabic. There are six vowels in Arabic divided into three pairs consisting of a short vowel and a long vowel. Each pair corresponds to a different phonetic value. A distinguished feature of the Arabic writing system is that short vowels are not represented by the letters of the Alphabet. Instead, they are marked by so-called diacritics, short strokes (marks) placed either above or below the preceding consonant. The process of adding all of the diacritics to an unmarked text is called diacritization.

Modern written Arabic texts are almost never diacritized (composed in script that leaves out the vowels of the words). However, native speakers can generally vocalize (diacritize) words in a text based on their context and knowledge of the grammar and lexicon of the language.

When vowel marks are not used in Arabic text, there is a multitude of possible vowel combinations for the same set of characters which constitute the word. On one hand all of these combinations are correct in the sense that the form is valid, but on the other hand not all of them are correct in the context in which the word is used. Because many words with different vowel patterns, may appear identical in a vowel-less setting, considerable ambiguity exists at the word level (lexical ambiguity). Recent studies revealed that about 74% of the words in an Arabic text are lexically ambiguous. This lexical ambiguity must be resolved by contextual information identifying all the Arabic word correct diacritics except diacritics at word ends signalling grammatical case endings (their use is somewhat optional depending on the formality of the language and on the speaker).

Contributing to Arabic lexical ambiguity, is the fact that Arabic morphology is complex. Studies show that there are about five possible different morphological analyses per Arabic word on average. Prefixes and suffixes can be attached to words in a concatenative manner. A single string can comprise verb inflections, prepositions, pronouns, and connectives. Therefore, word lexical disambiguation and vowel restoration in Arabic text is a challenging task.

Without disambiguation of Arabic words, it is impossible to determine how to pronounce a non-diacritized text. There are many words for which multiple pronunciation are possible and software applications such as Arabic Text-To-Speech (TTS) cannot function properly. Restoring the diacritized form of Arabic scripts, after lexical disambiguation, would be also very helpful for non-native speakers, and could assist in diacritizing beginners' texts, such as children's school books, and poetry books, a task that is currently done manually.

The problem of current methods for automatic diacritizating Arabic scripts, is that word lexical ambiguity severely degrades the diacritization word accuracy rate.

Current approaches include,
Statistically based approaches: a bigram Hidden Markov Model is used to gain contextual information and to restore vowels. However, the problem of unknown words not found in the training corpus, is not addressed. The use of a sufficiently large modern corpus of diacritized text leads in a blow-up in term of number of model parameters as they are quadratic in the number of word types in the training set.

Morphology based approaches: these techniques are word based and cannot disambiguate words in context. They output all possible analyses for each word in the text and rely on handcrafted rules and lexicon that govern Arabic morphology. But it is still unclear how the most likely parse can be chosen given the context.

A successful vowel restoration in Arabic script is mandatory for important applications such as Arabic Text-To-Speech (TTS) systems). Therefore, a robust method, not sensitive to unseen words in the training corpus and able to solve the lexical ambiguity of words in Arabic texts, is needed.

SUMMARY OF THE INVENTION

The present invention is directed to a method, system and computer program as defined in independent claims.

Further embodiments of the invention are provided in the appended dependent claims.

The present invention proposes a solution for the problem of word lexical disambiguation in Arabic texts. This solution is based on text domain-specific knowledge, which facilitates the automatic vowel restoration of modern standard Arabic scripts. Texts similar in their contents, restricted to a specific field, or sharing a common knowledge can be grouped in a specific category or in a specific domain (examples of specific domains: sport, art, economic, science . . . ).

The present invention discloses a method, system and computer program for lexically disambiguating non diacritized Arabic words in a text based on a learning approach that exploits:
Arabic lexical look-up, and
Arabic morphological analysis,
to train the system on a corpus of diacritized Arabic text pertaining to a specific domain. Thereby, the contextual relationships of the words related to a specific domain are identified, based on the valid assumption that there is less lexical variability in the use of the words and their morphological variants within a domain compared to an unrestricted text.

The main advantages of the present invention are:
1. Arabic words in a domain specific text are lexically disambiguated with great accuracy and therefore correct vowel pattern can be identified. It results in a significant improvement in the accuracy of automatic restoration of vowels of the words in the text. The diacritization word accuracy that is reached using the present invention exceeds the accuracy of other diacritization methods currently reported.
2. The problem observed in current automatic vowel restoration systems, of diacritization word accuracy due to unknown words in the training corpus, is significantly reduced based on the morphological variants of unknown words in the training data.
3. The method and system can be generalized to other Semitic languages.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

The following description is presented to enable one or ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A/ System for Lexically Disambiguating Non Diacritized Arabic Words

Figure 1:
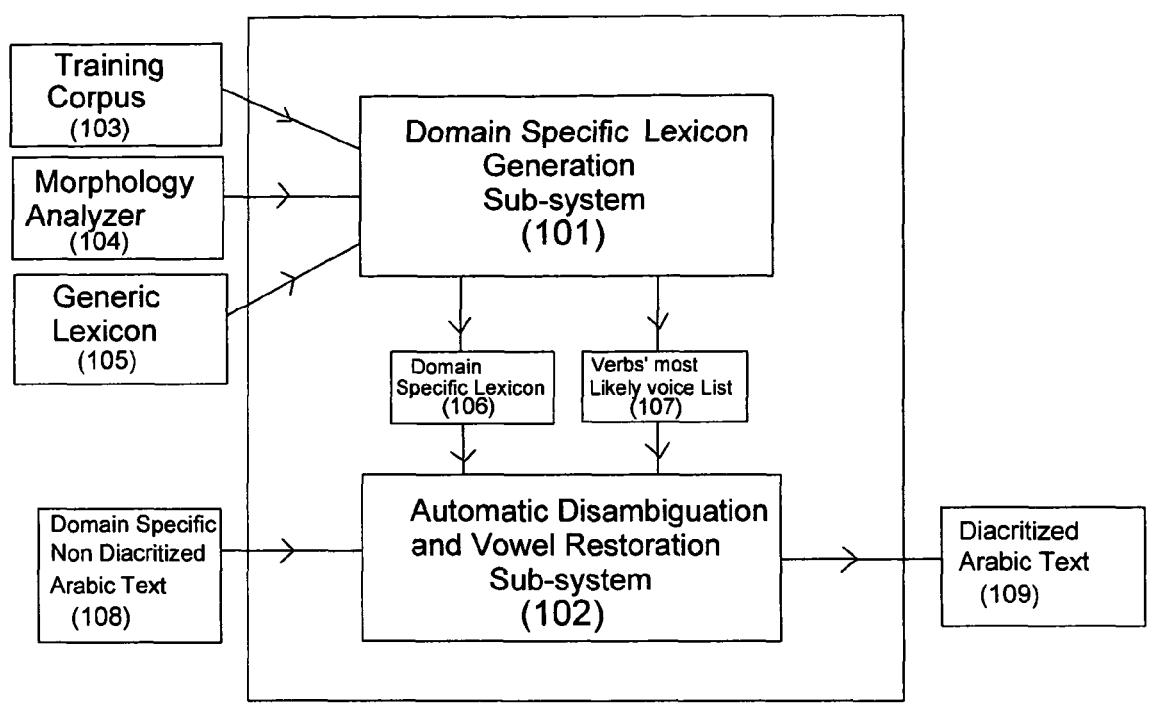
FIG. 1 is a general view of the system according to the present invention.

FIG. 1 is a general view of the system according to the present invention for lexically disambiguating non diacritized Arabic words in a text, based on a learning approach that exploits Arabic lexical look-up and Arabic morphological analysis (104). The system is trained on a corpus (103) of diacritized Arabic text pertaining to a specific domain.

B/ Method for Lexically Disambiguating Non Diacritized Arabic Words

The method according to the present invention, comprises two main phases:
1. a Domain Specific Arabic Lexicon Generation phase,
2. an Automatic Disambiguation and Vowel Restoration phase.

1. Domain Specific Arabic Lexicon Generation

Figure 2:
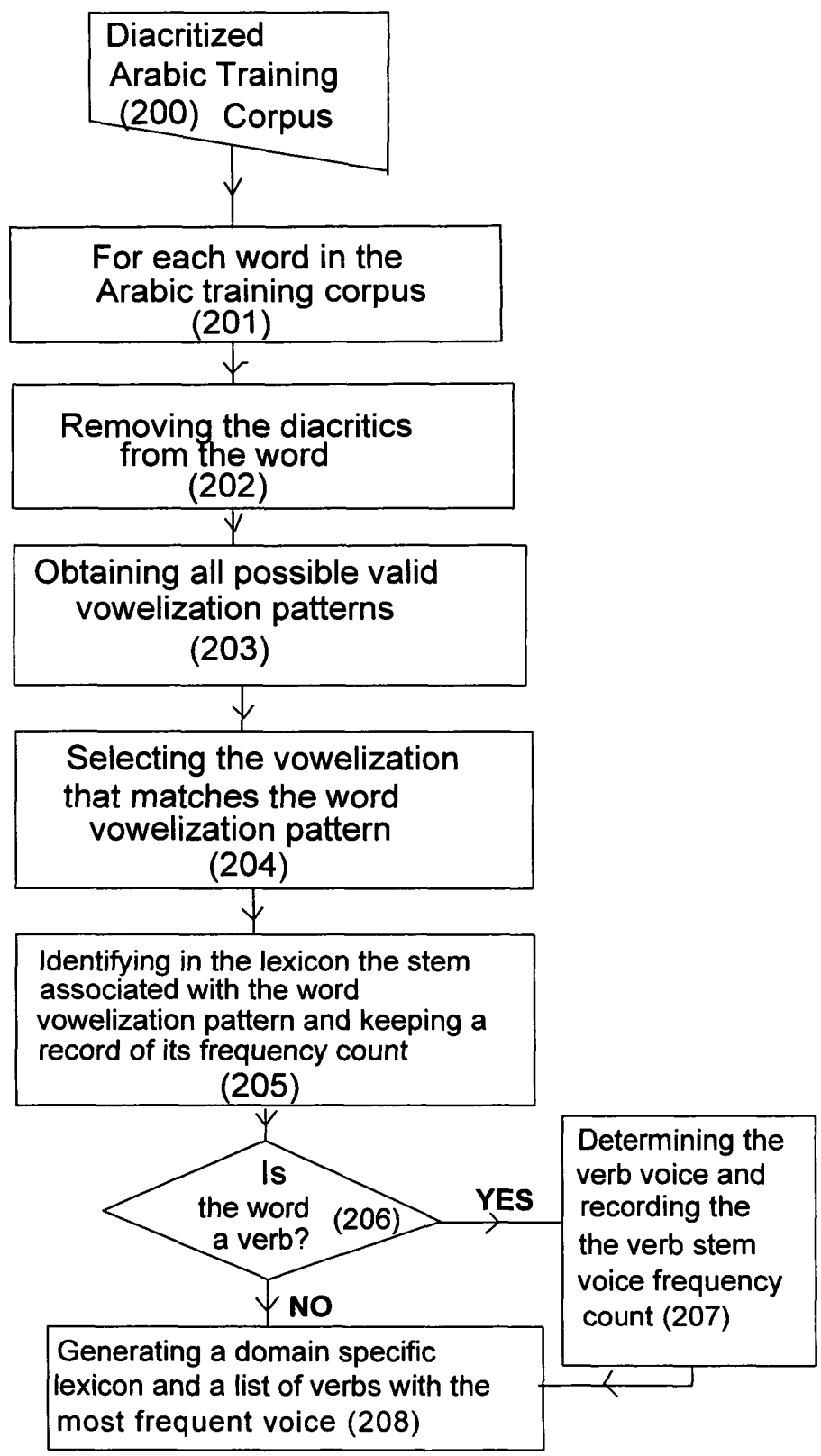
FIG. 2 is a flow chart illustrating the steps of the method according to the present invention for generating a domain specific Arabic lexicon.

FIG. 2 illustrates the phase of generating a domain specific Arabic lexicon. This phase is performed by the Domain Specific Lexicon Generation Sub-system (101) illustrated in FIG. 1. During this first phase, a diacritized Arabic training corpus (103) (comprising about a few tens of thousands of words) pertaining to a specific domain is used, based on the valid assumption that there is less lexical variability in the use of the words and their morphological variants within a domain compared to an unrestricted text.

As shown in FIG. 2, for each word in this diacritized Arabic text the following steps are performed:
Step 201: Removing the diacritics from the word.
Step 202: Obtaining all possible valid vowelization patterns for the word using a morphological analyzer (104) and a generic Arabic lexicon (105). Each vowelization pattern belongs to a different stem, though some stems may have the same identical sequence of Arabic letters in a vowel-less setting.
Step 203: Selecting (from the vowelization patterns obtained in Step 202) the one that matches the vowelization pattern of the word before removing its diacritics in step 201 above.
Step 204:
  Identifying in the generic Arabic lexicon (105), the stem associated with the vowelization pattern that matches the vowelization pattern of the word, using a morphological analyzer (104),
  Keeping a record of the frequency count of the vowellization stem in the diacritized training corpus (how many time the same stem is identified in the diacritized training corpus).
Note: the step, for each word, of keeping a record of the frequency count of the vowellization stem in the diacritized training corpus is necessary to disambiguate and diacritize all the words in the non-diacritized text. The disambiguating of Verbs is a particular case since the voice is ambiguous in a non-diacritized Arabic text, and affects the diacritization. Therefore, it is also necessary to record the voice frequency count of each verb in the diacritized training corpus to disambiguate the voice of non diacritized verbs.
Step 205: If the stem is for a verb (as identified by the morphological analyzer),
  Determining the voice of the verb stem (active/passive) as detected from the word vowelization pattern,
  Keeping a record of the verb stem voice frequency count in the diacritized training corpus (103) (how many time the voice of the verb stem is identified in the diacritized training corpus).
Note: in grammar, a verb can have an active or passive voice. The verb voice correspond to the form that the verb can take depending on whether the subject of the verb acts or is subject to the action.

After performing the above steps for all words of the diacritized domain specific Arabic training corpus (103):
Step 206: Keeping in the Arabic lexicon (106) only:
  the stems that have the highest number of morphological variants found in the diacritized training corpus (103), when multiple stems of identical character sequences exist.
  the stems that have no other identical sequence of characters.
  any stem randomly selected among stems that were not related to words in the training corpus (103) and have multiple identical character sequences.
Note: the morphological variants are the various morphologically related words found in the diacritized training corpus (the words that have the same stem).
Step 207: Deleting all other stem entries from the lexicon. Therefore, a domain specific lexicon (106) is generated from the Arabic generic lexicon (105).
Step 208: Finally, generating a list containing the stems for the verbs encountered in the diacritized training corpus (103) with for each stem, an identification of their most likely voice (voice that has the highest frequency count in the training corpus).

2. Automatic Disambiguation & Vowel Restoration

Figure 3:
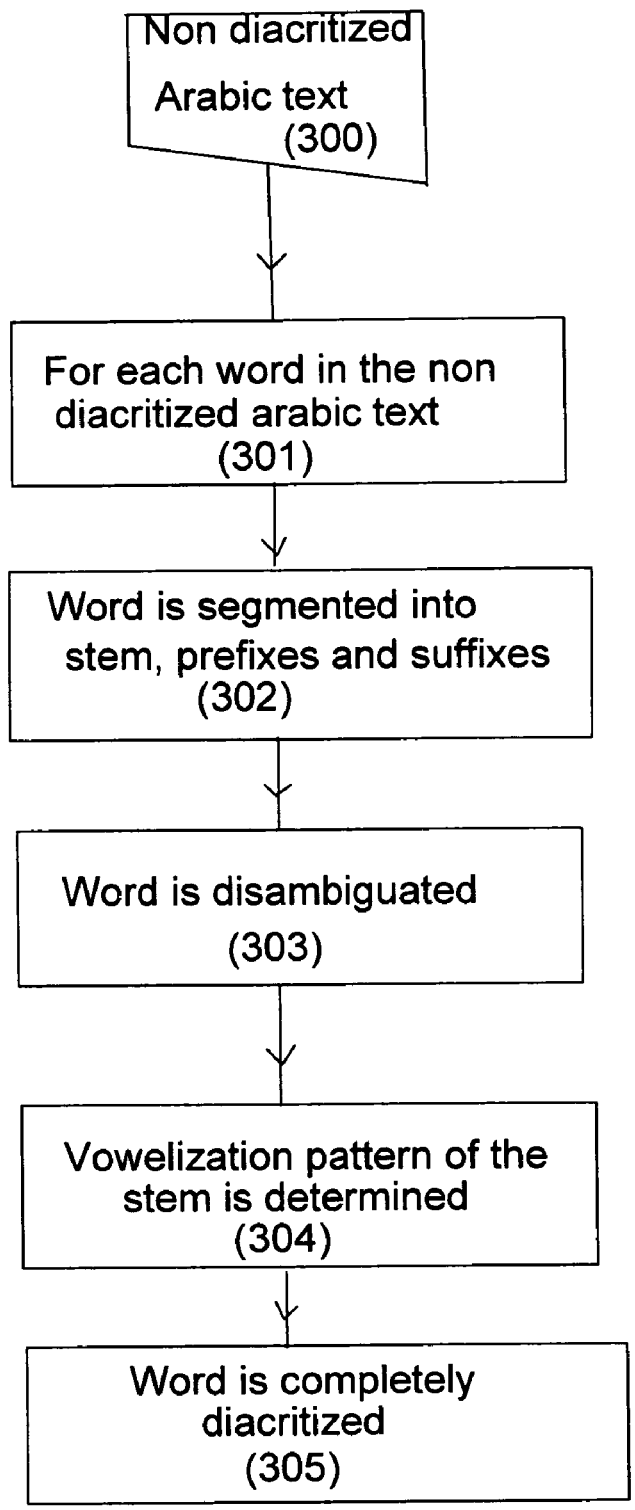
FIG. 3 is a flow chart illustrating the steps of the method according to the present invention for automatically disambiguating and restoring vowels.

FIG. 3 illustrates the phase of automatically disambiguating non diacritized Arabic words in a text and restoring vowels. This phase is performed by the
Automatic Disambiguation and Vowel Restoration Sub-system (102) illustrated in FIG. 1.

The Arabic automatic diacritization is based on the following Arabic word model: Word=Prefix (one or more or null)+ Stem+Suffix (one or more or null)

A stem is either derived or not derived from a root. The vowel pattern of a not derived stem is stored with the stem itself in the lexicon. Derived stems follow patterns that define the diacritization of their characters and are determined via a morphological analyzer (104) (except diacritics at word ends signalling grammatical case endings). Diacritization of the affixes (prefixes and suffixes) is fixed. The diacritized word is the concatenation of diacritized prefixes, stem and suffixes.

Given a domain specific Arabic lexicon (106) and a file comprising the most likely (frequent) voice for each verb in the domain (107), the method for automatically disambiguating non diacritized Arabic words in a text (108) and restoring vowels comprises the following steps for each word in a non diacritized Arabic text (108):

Step 301: First, segmenting the word (108) into a stem, a prefix and a suffix using a morphological analyzer (104).

Step 302: Since the domain specific lexicon (106) contains unique vowelization patterns for each stem, then disambiguating the word, and.

Step 303: Determining the vowelization pattern of the stem.

Step 304: Finally, completely diacritizing the word (109) by adding to the diacritized stem the diacritized prefixes and suffixes, according to the diacritization model described above.

The diacritization of a verb is based on the most likely (frequent) voice of this verb in the diacritized training corpus. The most likely voice of a verb is obtained from the list of verb stems (107) previously generated. This list comprises for each verb stem, the most frequent voice in the diacritized training corpus. Verb diacritization depends on whether the verb voice is active or passive. The diacritization corresponding to the most frequent voice of the verb in the training corpus is assigned to each non-diacritized verb in the text.

Diacritic at word ends signalling grammatical case endings are somewhat optional depending on the formality of the language and on the speaker. They could be determined using a syntactic analyzer, which is outside the scope of this invention.

In a preferred embodiment, the system according to the present invention for lexically disambiguating non diacritized Arabic words in a text, comprises a computer system and a computer program for carrying out the steps of the method according to the present invention when the computer program is executed on the computer system.

While the invention has been particularly shown and described with reference to a preferred embodiment, it will be understood that various changes in form and detail may be made therein without departing from the spirit, and scope of the invention.

What we claim is:

1. A method in a specific language, for lexically disambiguating non diacritized words in a text and restoring vowels, said method comprising the steps of:

automatically generating, by a lexicon generation sub-system, a domain specific lexicon based on a diacritized training corpus pertaining to a specific domain, including, for each word in the diacritized training corpus:
removing the diacritics from the word;
obtaining all possible valid vowelization patterns for the word, each vowelization pattern belonging to a different stem;
selecting from the obtained vowelization patterns, the vowelization pattern that matches the vowelization pattern of the word before the diacritics have been removed from the word;
identifying in a generic lexicon, a stem associated with the vowelization pattern that matches vowelization pattern of the word; and disambiguating, by a lexicon generation sub-system, non diacritized words in a text pertaining to the specific domain and restoring vowels by means of the previously generated domain specific lexicon thereby converting non diacritized words in the text to diacritized words.

2. The method according to claim 1 wherein the step for each word in the diacritized training corpus, of identifying in a generic lexicon, a stem associated with the vowelization pattern that matches the vowelization pattern of the word, comprises the further steps of:

recording how many time the identified stem is encountered in the diacritized training corpus.

3. The method according to claim 2 wherein the step of generating a domain specific lexicon based on a diacritized training corpus pertaining to a specific domain, comprises the further steps of:

keeping in the generic lexicon:
stems that have the highest number of morphological variants identified in the diacritized training corpus, when multiple stems with identical character sequences exist;
stems that have no other identical sequence of characters;
any stem randomly selected among stems that:
are not related to words in the diacritized training corpus, and
have multiple identical character sequences,
deleting from the generic lexicon all other stems and therefore generating a domain specific lexicon from the generic lexicon.

4. The method according to claim 3 wherein the step of disambiguating non diacritized words in a text and restoring vowels, comprises the further steps of:

for each word in the non diacritized text: segmenting the word into a stem, and affixes if any;
disambiguating the word using the domain specific lexicon, said domain specific lexicon comprising a unique vowelization pattern for each stem;
determining the vowelization pattern of the stem;
diacritizing the word by concatenating the diacritized stem with diacritized affixes if any.

5. The method according to claim 4 wherein the step of generating a domain specific lexicon based on a diacritized training corpus pertaining to a specific domain, comprises the further step of:

determining for each verb encountered in the diacritized training corpus, the most frequent voice.

6. The method according to claim 5 wherein the step, for each word in the diacritized training corpus, of identifying in a generic lexicon, a stem associated with the vowelization pattern that matches the vowelization pattern of the word, comprises the further steps of:

if the identified stem is for a verb:
determining the voice of the verb stem from the word vowelization pattern; and,
recording how many time the voice of the verb stem is encountered in the diacritized training corpus.

7. The method according to claim 6 wherein the step of disambiguating non diacritized verbs by means, for each verb, of the most frequent voice encountered in the diacritized training corpus, comprises the preliminary step of:

generating a list comprising the verb stems encountered in the diacritized training corpus with for each of the stems, an identification of the most frequent voice.

8. The method according to claim 1 wherein the step of disambiguating non diacritized words in a text pertaining to the specific domain and restoring vowels by means of the previously generated domain specific lexicon, comprises the further step of:

disambiguating non diacritized verbs by means, for each verb, of the most frequent voice encountered in the diacritized training corpus.

9. The method according to claim 8 wherein said specific language is Arabic, said non diacritized text is an Arabic text, said diacritized training corpus is in Arabic.

10. A system comprising means adapted for carrying out the steps of the method according to claim 1.

\* \* \* \* \*